United States Patent
Dayley et al.

[11] Patent Number: 6,149,959
[45] Date of Patent: Nov. 21, 2000

[54] PROCESS FOR PREPARING DOCKERED POTATO PRODUCTS

[75] Inventors: Kyle E. Dayley; LaRue Bunker, both of Rigby, Id.

[73] Assignee: Miles Willard Technologies, L.L.P., Idaho Falls, Id.

[21] Appl. No.: 09/197,194

[22] Filed: Nov. 20, 1998

[51] Int. Cl.[7] .................................................. A23L 1/217
[52] U.S. Cl. .......................... 426/438; 426/441; 426/637; 426/808
[58] Field of Search .................................... 426/143, 438, 426/441, 637, 514, 523, 808, 518

[56] References Cited

U.S. PATENT DOCUMENTS

| | | | |
|---|---|---|---|
| 3,230,094 | 1/1966 | Hilton . | |
| 3,278,311 | 10/1966 | Brown et al. . | |
| 3,502,479 | 3/1970 | Singer et al. . | |
| 3,690,895 | 9/1972 | Amadon et al. . | |
| 3,800,050 | 3/1974 | Popel | 426/343 |
| 3,880,069 | 4/1975 | Moline | 99/483 |
| 3,988,953 | 11/1976 | Bosley et al. | 83/2 |
| 4,086,368 | 4/1978 | Bosley et al. | 426/464 |
| 4,170,659 | 10/1979 | Totino et al. | 426/95 |
| 4,395,216 | 7/1983 | Anetsberger et al. | 425/290 |
| 4,650,687 | 3/1987 | Willard et al. | 426/438 |
| 4,756,920 | 7/1988 | Willard | 426/549 |
| 4,770,891 | 9/1988 | Willard | 426/559 |
| 4,889,737 | 12/1989 | Willard et al. | 426/550 |
| 4,931,303 | 6/1990 | Holm et al. | 426/549 |
| 4,994,295 | 2/1991 | Holm et al. | 426/549 |
| 5,366,749 | 11/1994 | Frazee et al. | 426/549 |
| 5,652,010 | 7/1997 | Gimmler et al. | 426/549 |

*Primary Examiner*—Arthur L. Corbin
*Attorney, Agent, or Firm*—Hopkins Roden Crockett Hansen & Hoopes, PLLC

[57] ABSTRACT

A process for preparing potato products, such as potato chips, cottage fries, and French fries is provided. The process includes the steps of: placing raw potato slices on a moving conveyor belt; dockering the potato slices by moving the slices under a rotating dockering brush having flexible bristles; and then cooking the dockered potato slices. The finished products are characterized by fewer pillows and blisters, lower moisture contents, and reduced cooking times.

26 Claims, 7 Drawing Sheets

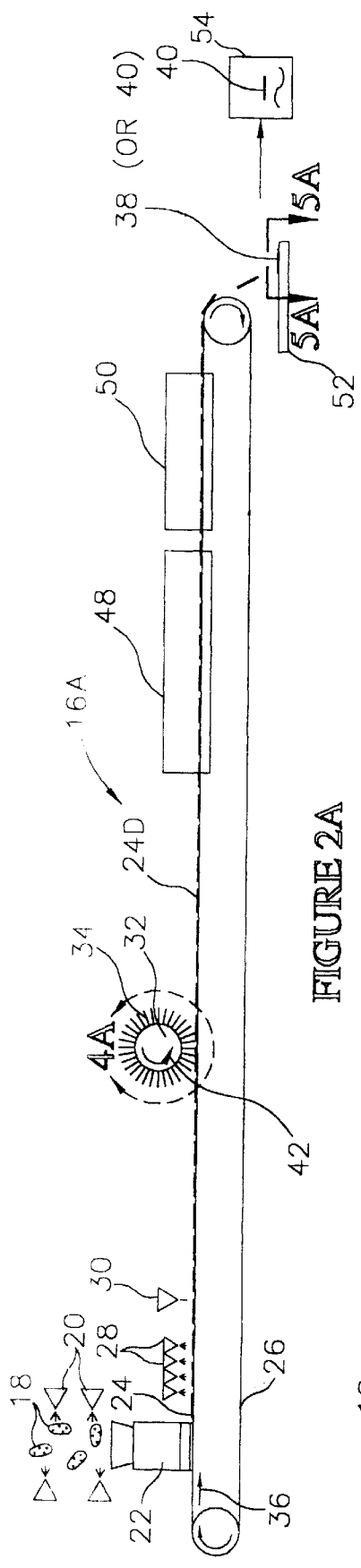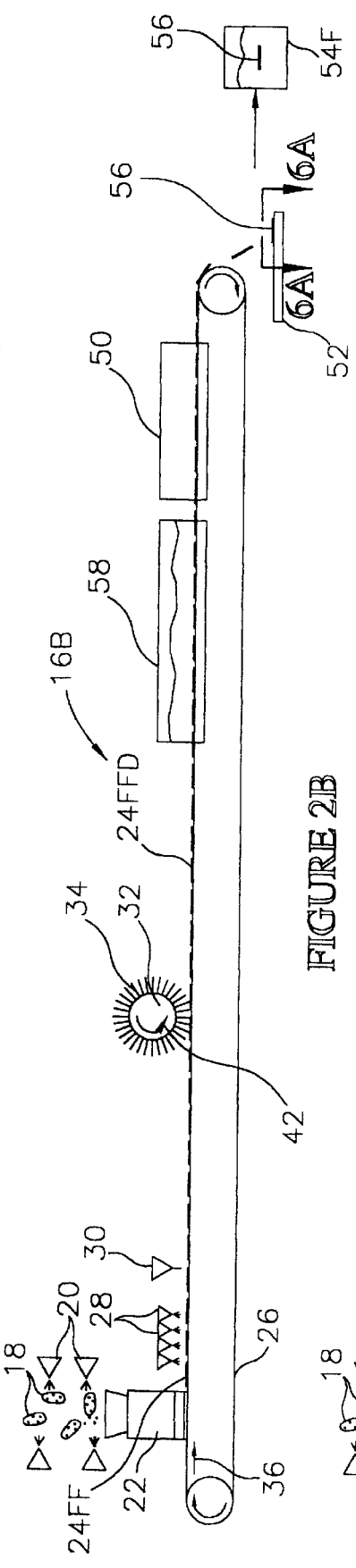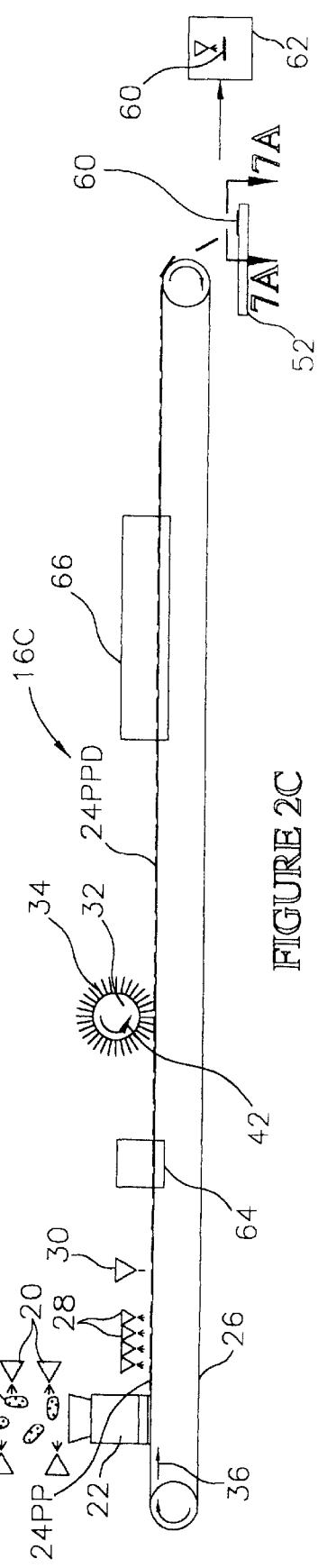

PROCESS FOR PREPARING DOCKERED POTATO PRODUCTS

FIELD OF THE INVENTION

This invention relates generally to the preparation of potato products such as fried, baked, and dehydrated potato products.

BACKGROUND OF THE INVENTION

Potato slices can be used to make different types of potato products. Potato chips, for example, are made by frying potato slices in hot oil, and then applying a seasoning, such as salt. Potato slices can also be baked to make low fat potato chips and other snack products. Sometimes the products are frozen and then reheated by food service establishments and consumers for consumption. In addition, potato slices can be partially cooked, dehydrated, and then rehydrated for preparing casseroles, soups, salads and entrees. Dehydrating of potato slices permits storage of the slices for long periods of time, and rehydration on an "as needed" basis.

Often the preparation of fried, baked or dehydrated potato slices results in pillowing and blistering in the finished potato product. FIGS. 1A–1D illustrate a potato product 10, in the form of a fried potato chip, that has undergone pillowing and blistering. Pillowing refers to an uncontrolled separation of major portions of opposing surfaces of the potato product 10. FIG. 1C illustrates a pillow 12 in the potato product 10. Blistering is similar to pillowing except that the separation occurs from only one surface of the potato product 10. FIG. 1D illustrates a blister 14 in the potato product 10.

One explanation for pillowing and blistering is that during the cooking process starch in outer layers of the potato slice gelatinizes and loses moisture more rapidly than starch in the center of the potato slice. This forms a "skin" on the outer surface of the potato slice. In addition, steam can be trapped within the intercellular spaces of the potato slice. The steam forces the cells apart as the pectic substances between adjacent cell walls softens and solubilizes. However, the "skin" retards the escape of steam, causing the trapped steam to form a pillow or a blister.

Pillowing and blistering can adversely affect the appearance, texture and taste of potato products. For example, pillows and blisters tend to absorb oil in a fried product making the product greasy. In addition, pillowing and blistering can cause excessive breakage during packaging, shipping, and storing of a potato product. Still further, pillowing and blistering can cause dehydrated products to have a non-uniform moisture content and to rehydrate in a non-uniform manner. In addition, the blistered or pillowed areas tend to slough away during rehydration.

Various methods for reducing pillowing and blistering have been used in the preparation of conventional potato products. For example, pillowing and blistering in conventional potato chips has been controlled by adjusting the thickness of the potato slice, and the frying temperature. In general, thinner potato slices, produce less pillowing and blistering. However, some consumers prefer relatively thick potato chips, such that making the potato slices thinner is not always a satisfactory option. Lowering the frying temperature can also reduce pillowing and blistering, but can also increase cooking times and increase oil absorption.

Another method of controlling pillowing and blistering in conventional potato products is by increasing the moisture content of the potato slices, such as by soaking the slices in a salt solution. This slows the cooking process and inhibits blister formation. However, the taste and texture of the finished potato product can be adversely affected by the increased moisture content.

It is also known in the food preparation art that blistering and pillowing in some food products can be reduced by perforating the product with openings. The openings provide conduits for venting steam, thus preventing formation of the pillows and blisters. The process of perforating the product is referred to as "dockering", and the perforated product is referred to as being "dockered".

Typically, dockering has been employed with products that are made using some type of dough. For example, pizza can be made using dockered flour dough, as described in U.S. Pat. Nos. 4,170,659; 4,395,216; and 3,880,069. Fried corn chips can be made using dockered masa dough as described in U.S. Pat. No. 2,905,559. Fabricated potato chips, can be made using dockered potato dough, as described in U.S. Pat. Nos. 4,650,687; 4,931,303; 4,650,687; and 4,889,737. Dockering has also been employed in the dehydration of potatoes as described in U.S. Pat. Nos. 3,988,953 and 4,086,368.

The present invention adapts the dockering process to the preparation of potato products made with raw potato slices rather than dough. In addition, the dockering process can be controlled to produce openings having a conical shape, which facilitates moisture release from the potato products during cooking or dehydration, and moisture absorption during rehydration.

SUMMARY OF THE INVENTION

In accordance with the present invention, a process for preparing potato products by dockering raw potato slices using flexible bristles, is provided. The dockering process modifies the raw potato slices and improves the potato products.

The process, simply stated, comprises: providing raw potato slices on a moving conveyor belt; dockering the slices by moving the slices under a rotating dockering brush having flexible bristles; and then cooking or dehydrating the dockered slices. In illustrative embodiments, the process is used to prepare potato chips, cottage fries, French fries, and dehydrated potato pieces.

For providing the raw potato slices, whole potatoes can be sorted to remove defects, washed, scrubbed and sliced. The potato slices can then be placed in a monolayer (i.e., single layer) on a moving conveyor belt for rinsing and modifying by dockering. Dockering can be performed using a rotating brush having flexible bristles. A diameter and count of the bristles can be selected to perforate the potato slices with openings having a desired size and spacing. In addition, the dockering step can be controlled to form the openings with a conical shape which facilitates moisture release during the subsequent cooking or dehydration step.

During dockering, the bristles initially contact the moving slices, bend in a first direction to penetrate the slices with a random pattern of openings, bend in a second direction to enlarge the openings, and then straighten to release the dockered slices. An overdrive of the bristles into the conveyor belt, and a rotational velocity of the bristles relative to a linear velocity of the potato slices, can be selected to control the dockering step. In addition, the conveyor belt can include a resilient surface for supporting the potato slices during dockering, and for carrying the dockered slices away from the dockering brush.

Following dockering, the potato slices can be cooked by frying, parfrying, or baking. Modifying the potato slices by dockering reduces pillowing and blistering during cooking, decreases cooking time, and provides a cooked product having a lower moisture content and an improved texture. In addition, dockering permits thicker and larger slices to be employed for products such as potato chips. Following cooking, the potato slices can be cooled and packaged. For some products, such as cottage fries and French fries, the potato pieces can be reheated prior to consumption.

In an alternate embodiment process, the dockered potato slices can be blanched prior to dockering, and dehydrated following dockering, to form dehydrated potato pieces. Modifying the potato slices by dockering reduces pillowing and blistering during dehydration. In addition, dockering reduces dehydration and rehydration times, and increases water absorption during rehydration.

BRIEF DESCRIPTION OF THE DRAWINGS

FIG. 2A is a schematic drawing of a system for preparing fried or baked potato products in accordance with the process of the invention;

FIG. 2B is a schematic drawing of a system for preparing parfried potato products in accordance with an alternate embodiment process of the invention;

FIG. 2C is a schematic drawing of a system for dehydrating potato products in accordance with another alternate embodiment process of the invention;

DETAILED DESCRIPTION OF THE PREFERRED EMBODIMENTS

Figure 1A:
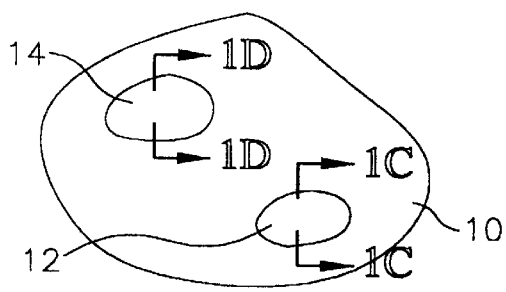
FIG. 1A is a plan view of a prior art potato chip.
Figure 1C:
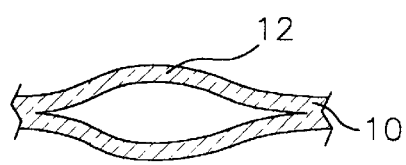
FIG. 1C is an enlarged cross sectional view taken along section line 1C—1C of FIG. 1A illustrating a pillow on the potato chip.
Figure 1B:
FIG. 1B is a side elevation view of the potato chip.
Figure 1D:
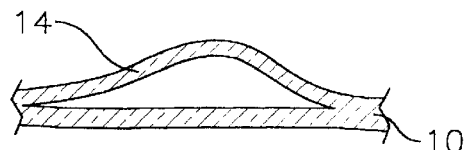
FIG. 1D is an enlarged cross sectional view taken along section line 1D—1D of FIG. 1A illustrating a blister on the potato chip.
Figure 3A:
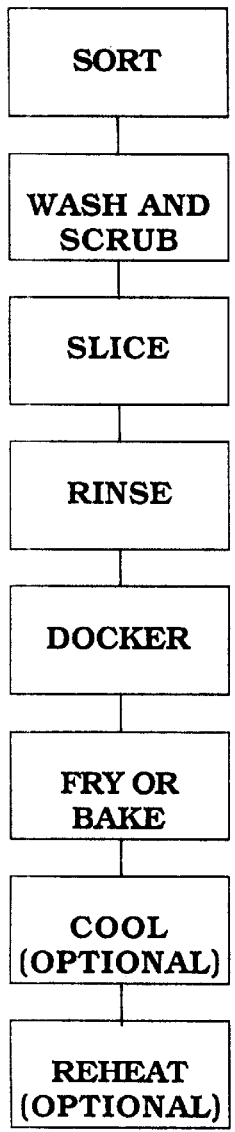
FIG. 3A is a flow diagram illustrating the process of FIG. 2A.

Referring to FIG. 2A, a system 16A for preparing potato products in accordance with the process of the invention is illustrated. As will be further explained, the system 16A is configured for preparing potato chips 38 or alternately cottage fries 40. FIG. 3A outlines process steps during operation of the system 16A of FIG. 2A.

Initially, raw (uncooked) potatoes 18 are received from the field or storage and are sorted. Sorting may be accomplished using flumes (not shown) or other sorting mechanisms that are known in the art. In addition, the potatoes 18 can be washed and scrubbed using a scrubbing apparatus 20. Washing and scrubbing substantially removes the peels of the potatoes 18. One suitable scrubbing apparatus is referred to as a "peeler/washer" and is manufactured by Van Mark Corporation of Iowa.

Next, the washed and scrubbed potatoes 18 are fed into a slicing apparatus 22. The slicing apparatus 22 can comprise a commercial vegetable slicing and dicing apparatus, such as one manufactured by Urschel Laboratories Inc. of Valparaiso, Ind. Depending on the potato product being prepared, a representative thickness ($T_{PS}$—FIG. 4D) of the potato slices 24 can be from about 0.04 inches (0.10 cm) to about 0.125 inches (0.317 cm).

The slicing apparatus 22 deposits raw potato slices 24 into a holding tank (not shown), and an endless, moving, conveyor belt 26 removes the potato slices 24 in a monolayer from the holding tank. Preferably, the conveyor belt 26 comprises a polymer material suitable for use with food products. In addition, the conveyor belt 26 can be a resilient material to facilitate the dockering process to be hereinafter described. The conveyor belt 26 transports the potato slices 24 in a linear direction as indicated by arrow 36. The potato slices 24 have a linear velocity ($V_{PS}$—FIG. 4A) that is equal to the linear velocity of the conveyor belt 26.

Following deposition onto the conveyor belt 26, the potato slices 24 are rinsed by nozzles 28 that direct water, or a rinsing solution, onto the moving potato slices 24. Rinsing removes starches, and makes the potato slices 24 less sticky. In addition, rinsing helps to remove the earthy flavor associated with raw potatoes. If desired, excess water, or rinsing solution, can be blown from the potato slices 24 using an air nozzle 30.

Following rinsing, the potato slices 24 are dockered by movement under, or across, a rotating dockering brush 32 having flexible bristles 34. In FIG. 2A, the dockered potato slices are designated 24D.

Figure 4A:
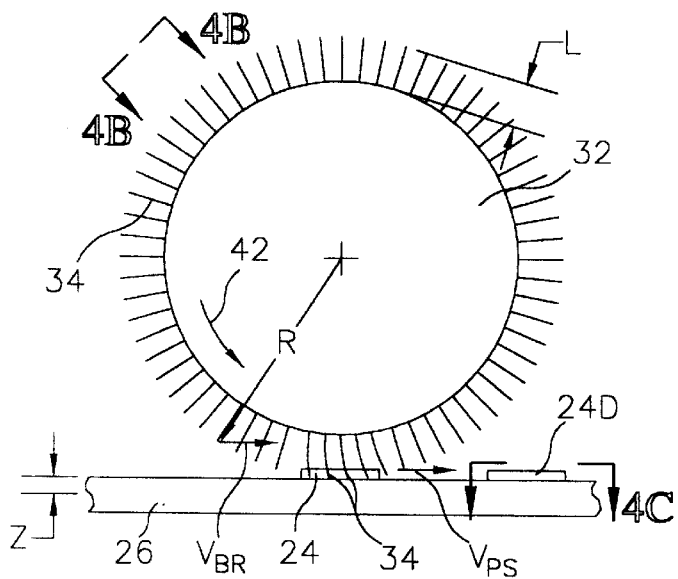
FIG. 4A is an enlarged view taken along section line 4A—4A of FIG. 2A illustrating a dockering brush of the system.

Referring to FIG. 4A, details of the dockering brush 32 are illustrated. The dockering brush 32 comprises a cylindrical member rotatably mounted on bearings for rotation in a direction indicated by rotational directional arrow 42. A drive unit (not shown) associated with the dockering brush 32 drives the dockering brush 32 at a predetermined rpm (revolutions per minute).

Figure 4B:
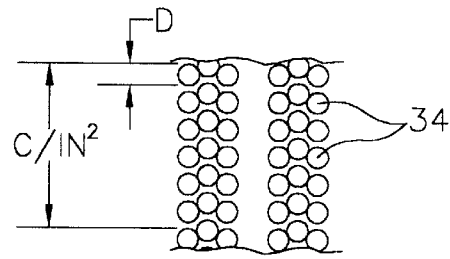
FIG. 4B is an enlarged view taken along section line 4B—4B of FIG. 4A illustrating flexible bristles on the dockering brush.

The dockering brush 32 includes a plurality of flexible bristles 34 mounted to the outer circumferential surface thereof. The flexible bristles 34 are adapted to penetrate the moving potato slices 24 to form a plurality of openings 46 (FIG. 4C) in the potato slices 24. One suitable material for the flexible bristles comprises "NYLON". As shown in FIG. 4B, the bristles 34 have an outside diameter "D" that is preferably between about 0.02 inches (0.051 cm) to 0.06 inches (0.15 cm). In addition, a density (count) of the bristles 34 is preferably about 80–160 per in$^2$ (12–25 per cm$^2$). As shown in FIG. 4A, a length "L" of the bristles 34 is preferably about 1.25 inches (3.17 cm) to 2.0 inches (5.07 cm).

Preferably the bristles 34 are moving at a slower speed than the potato slices 24 which facilitates the release of the dockered potato slices 24D from the dockering brush 32. Accordingly, a rotational speed (rpm) and radius R, of the dockering brush 32 can be selected such that a rotational velocity $V_{BR}$ of the bristles 34 is a predetermined percentage of the linear velocity $V_{PS}$ of the potato slices 24. A representative value for $V_{BR}$ is from about 40% to 100% of $V_{PS}$. With the bristles 34 moving slower than the potato slices 24, the conveyor belt 26 carries the dockered potato slices 24D away from the bristles 34, which in effect "releases" the slices 24D. In addition, the speed differential helps to facilitate penetration of the potato slices 24 by the bristles 34.

To also facilitate penetration, the dockering brush 32 is located with respect to the conveyor belt 26, such that a force is applied for pushing the bristles 34 into the potato slices 24. Specifically, the bristles 34 are "preflexed" by locating the tips of the bristles 34 with an offset "Z" with respect to a surface of the conveyor belt 26. The offset "Z" is preferably about 0.031 inch (0.79 cm) to about 0.093 inch (0.238 cm). The offset "overdrives" the bristles 34 into the potato slices 24, such that the bristles 34 bend upon contact with the conveyor belt 26 in a direction away from the rotational direction of the dockering brush 32. Following penetration, the bristles 34 bend in a direction towards the rotational direction of the dockering brush 32 to enlarge initially formed openings, then straighten to release the dockered potato slices 24D.

Figure 4C:
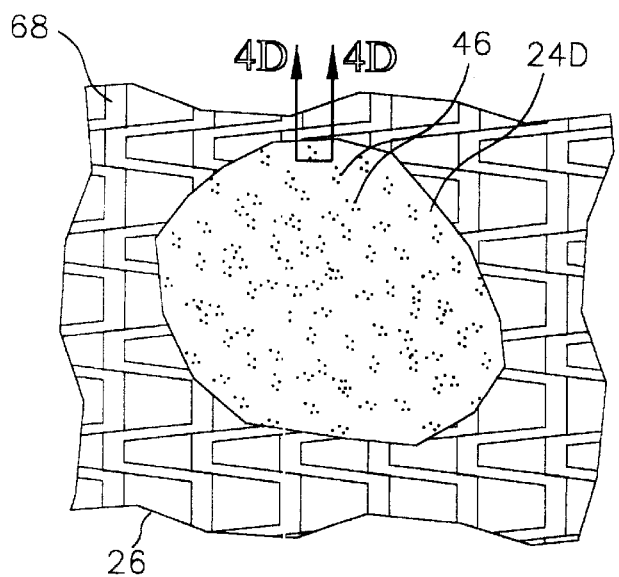
FIG. 4C is a plan view taken along line 4C—4C of FIG. 4A illustrating a potato slice following dockering.
Figure 4D:
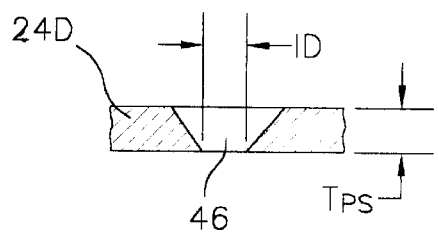
FIG. 4D is an enlarged cross sectional view taken along section line 4D—4D of FIG. 4C illustrating a perforated opening in the potato slice.
Figure 4E:
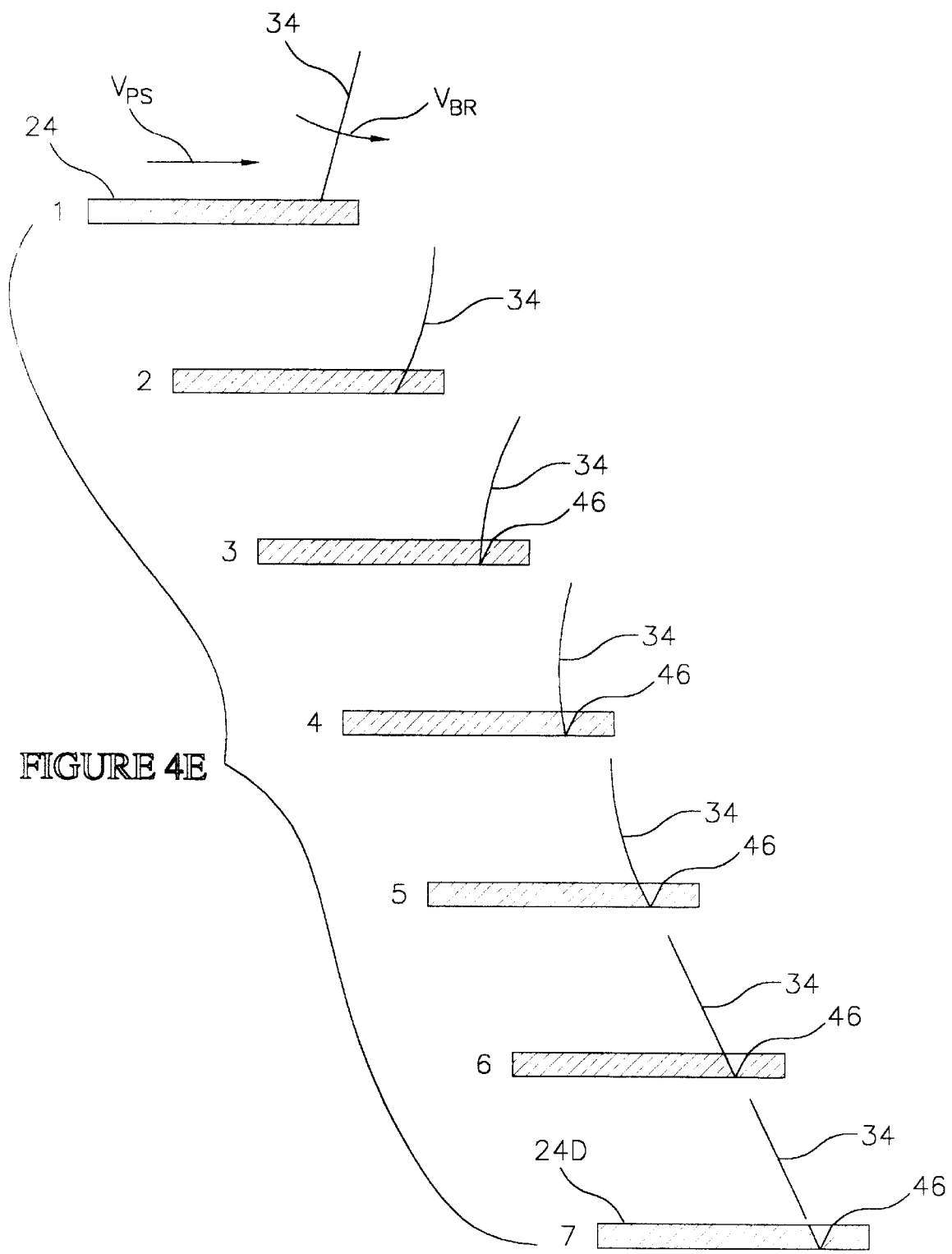
FIG. 4E is a schematic diagram illustrating flexure of a single bristle during penetration of a potato slice and formation of a conical opening in the slice.

Referring to FIG. 4E, a single bristle 34 moving with a rotational velocity $V_{BR}$ is illustrated during penetration of a potato slice 24 moving with linear velocity $V_{PS}$. Initially, as shown in Frame 1, the bristle 34 is straight as contact is made with the potato slice 24. In Frame 2, a tip of the bristle 34 begins to bend and to penetrate the potato slice 24. As the potato slice 24 is traveling faster than the bristle 34, the initial bending is away from the direction of the rotational velocity $V_{BR}$ and away from the direction of the linear velocity $V_{PS}$.

In Frame 3, the tip of the bristle 34 reverses bending direction, and bends towards the direction of rotational velocity $V_{BR}$, and towards the direction of the linear velocity $V_{PS}$. The reverse bending of the bristle forms an opening 46 in the potato slice 24. In Frame 4, the tip of the bristle 34 continues to bend upon contact with the conveyor belt 26 and begins to enlarge the opening 46. In Frame 5 the tip of the bristle 34 continues to bend and further enlarges the opening 46.

In Frame 6, the tip of the bristle 34 begins to straighten as the potato slice 24 moves away. In Frame 7, following formation of the opening 46, the bristle 34 lifts free from the dockered potato slice 24D, as the conveyor belt 26 carries the dockered potato slice 24D away. In addition to allowing the dockered potato slice 24D to release, straightening of the bristle 34 pushes the dockered potato slice 24D away from the dockering brush 32.

As also shown in Frame 7, penetration and bending by the bristle 34 forms the opening 46 in a generally conical shape. In other words, the inside diameter of the opening 46 is larger at the upper surface of the dockered potato slice 24D where contact with the bristle 34 occurs first, and is smaller at the lower surface of the dockered potato slice 24D where there is contact with the conveyor belt 26. This conical shape can also be described as being "oblated" or "substantially" conical.

FIG. 4D illustrates the smaller inside diameter ID of the opening 46 at the lower surface of the dockered potato slice 24D. In general, this smaller inside diameter "ID" is approximately equal to but slightly larger than the diameter "ID" of the bristles 34 (i.e., ID=xD).

During a subsequent cooking, or dehydration process, the conical shape of the openings 46 facilitates moisture release, and prevents pillowing and blistering in potato products. For example, during frying of a product such as a potato chip, the conically shaped openings 46 allow for rapid release of steam from the upper surface of each dockered potato slice 24D. A moisture content of the fried product is thus substantially lower than undockered potato slices, and also lower than potato slices dockered with a steel pin. For dehydrated products, the conically shaped openings 46 facilitate moisture removal during dehydration. The conically shaped openings 46 also provide a larger surface area for rehydrating the dehydrated potato product, as a rehydrating liquid can more easily contact an interior portion of the product.

In general, larger diameter openings 46 (e.g., D=0.06 inches) produce the lowest moisture content in the cooked or dehydrated product. However, the cosmetic appearance of the product is adversely affected by larger diameter openings, such that diameters of greater than about 0.06 inches are not desirable. In a similar manner, a density of the openings 46 can be selected to provide a desired moisture content and cosmetic appearance for the cooked or dehydrated product.

As shown in FIG. 4C, the openings 46 have a random pattern that substantially matches the pattern of the bristles 34 on the dockering brush 32. As shown in FIG. 4D, the openings 46 in the dockered potato slices 24D can extend completely through the full thickness $T_{PS}$. Alternately, the dockering brush 32 can be located with respect to the conveyor belt 26 such that the dockered potato slices 24D are only partially penetrated. In this case the bristles 34 can be preflexed by the thickness of the potato slices 24.

As also shown in FIG. 4C, the conveyor belt 26 supports the potato slices 24 during penetration by the bristles 34. Preferably the conveyor belt 26 comprises a resilient material (e.g., polyurethane, ethylene, propylene) such that the potato slices 24 are resiliently supported and penetration forces are cushioned. For example, the conveyor belt 26 can comprise an open mesh material having chain links 68. Alternately, the conveyor belt 26 can have a flat solid surface, or a flat wire configuration. Suitable conveyor belts are commercially available from Falcon Belting, Inc., Oklahoma City, Okla. The conveyor belt 26 can be supported by an underlying backing plate (not shown) and can be driven at a required speed using techniques and equipment that are known in the art.

Referring again to FIG. 2A, following dockering, the dockered potato slices 24D are cooked using a cooking apparatus 48. In addition, the dockered potato slices 24D can be seasoned (not shown) either prior to or following cooking. For preparing fried potato products, the cooking apparatus 48 can comprise a frying apparatus. Representative frying temperatures can be from about 290° F. (143° C.) to 370° F. (188° C.) for a time period sufficient to achieve a desired moisture content. For preparing baked potato products, the cooking apparatus 48 can comprise an oven. Representative baking temperatures can be from about 315° F. (157° C.) to about 400° F. (204° C.). Whether fried or baked, the moisture content of the dockered potato slices 24D can be reduced to between about 1 and 12 percent. Also, for some potato products the cooking process can partially cook the product, with full cooking performed by the end user prior to consumption.

Following cooking, the dockered potato slices 24D can optionally be cooled using a cooling apparatus 50. For some potato products, such as potato chips 38, the cooling apparatus 50 can comprise fans configured to air cool the product to approximately room temperature. For other potato products, such as cottage fries 40, the cooling apparatus 50 can comprise a refrigerator configured to cool the product to a refrigeration temperature, or a freezer configured to cool the product to a freezing temperature.

Following cooking and optional cooling, the dockered potato slices 24D are deposited on a packaging apparatus 52. With the product comprising potato chips 38, consumption can be performed from the package without further processing. With the product comprising cottage fries 40, a reheating apparatus 54 such as an oven, frying apparatus, or microwave can be employed to reheat the product for consumption. A representative moisture content of the product following reheating can be about 2%–20% range.

Figure 5A:
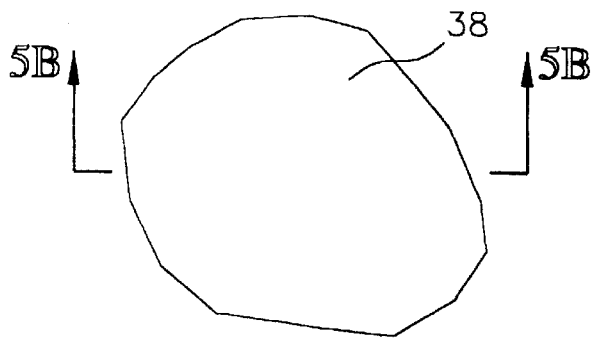
FIG. 5A is a plan view taken along line 5A—5A of FIG. 2A illustrating a potato chip prepared in accordance with the invention.
Figure 5B:
FIG. 5B is a cross sectional view of the potato chip taken along section line 5B—5B of FIG. 5A.

Referring to FIGS. 5A and 5B, the cooked potato chip 38 is illustrated. Due to the dockering step the potato chip 38 has a lower moisture content, cooks without forming blisters and pillows, and has an improved texture. Since dockering reduces pillowing and blistering, the potato slices 24 can be thicker than slices employed during fabrication of conventional undockered potato slices. In addition, with a lower moisture content, the dockered potato slices 24D cook faster than conventional undockered slices, such that cooking times are reduced.

Figure 3B:
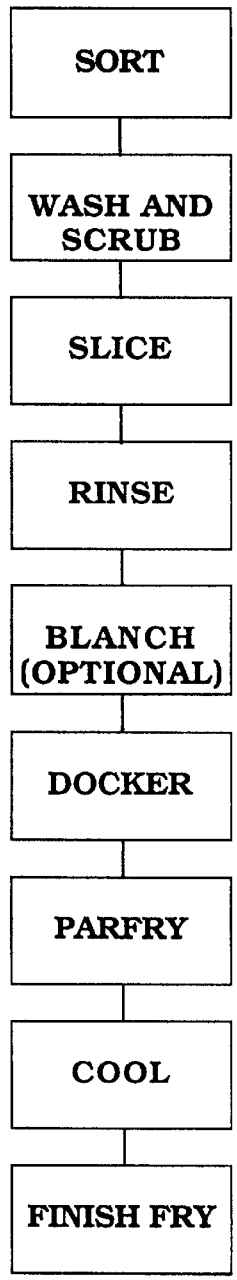
FIG. 3B is a flow diagram illustrating the process of FIG. 2B.

Referring to FIG. 2B, an alternate embodiment system 16B is illustrated. The system 16B is configured for preparing French fries 56. FIG. 3B outlines process steps during operation of the system 16B of FIG. 2B.

The system 16B includes washing apparatus 20 and slicing apparatus 22 that function substantially as previously described. However, in this embodiment potato pieces 24FF are shaped to form French fries 56. The potato pieces 24FF are removed from a holding tank (not shown) of the slicing apparatus 22 by the conveyor belt 26 in a monolayer, and are rinsed using rinsing nozzles 28 substantially as previously described. In addition, the potato pieces 24FF can be dockered using a dockering brush 32 having flexible bristles 34 to form dockered potato pieces 24FFD, substantially as previously described. Prior to dockering, the rinsed potato pieces 24FF can optionally be blanched, and partially dried.

Following dockering, the dockered potato pieces 24FFD are parfried using a frying apparatus 58. The dockered potato pieces 24FFD can be parfried at a temperature of between about 290° F. (143° C.) to 370° F. (188° C.), and preferably at a temperature of about 315° F. (157° C.). A representative moisture content of the parfried potato pieces 24FFD can be between about 1% to 70%. Following parfrying (or alternately prior to parfrying) the dockered potato pieces 24FFD can be seasoned. Also following parfrying, a cooling apparatus 50 as previously described, can be used to cool the parfried dockered potato pieces 24FFD to a refrigeration or freezing temperature.

Next, the completed French fries 56 can be packaged using a packaging apparatus 52 as previously described. In addition, the French fries 56 can be reheated for consumption using a reheating apparatus 54F such as a frying apparatus.

Figure 6A:
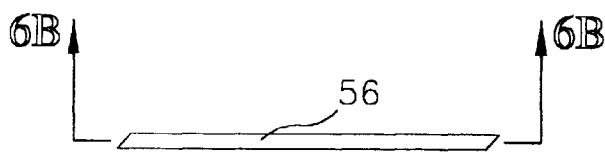
FIG. 6A is a plan view taken along line 6A—6A of FIG. 2B illustrating a French fry prepared in accordance with the invention.
Figure 6B:
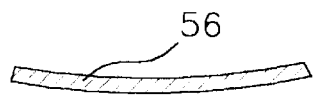
FIG. 6B is a cross sectional view taken along section line 6B—6B of FIG. 6A.

As shown in FIGS. 6A and 6B, the French fries 56 are substantially free of pillows and blisters following parfrying. In addition, the French fries 56 remain substantially free of pillows and blisters during reheating.

Figure 3C:
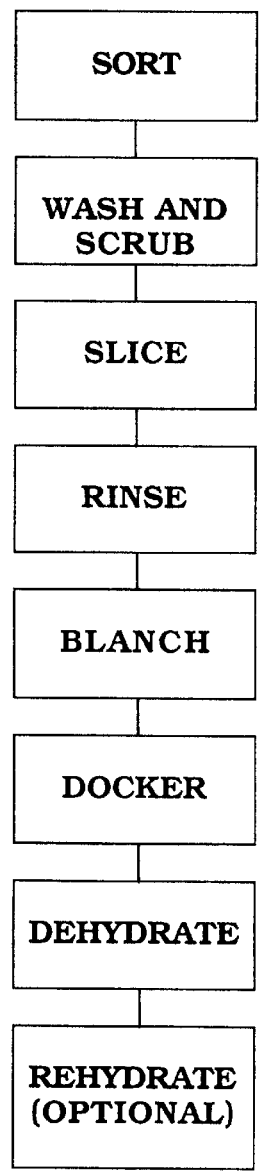
FIG. 3C is a flow diagram illustrating the process of FIG. 2C.

Referring to FIG. 2C, an alternate embodiment system 16C is illustrated. The system 16C is configured for preparing dehydrated potato pieces 60. FIG. 3C outlines process steps during operation of the system 16C of FIG. 2C.

The system 16C includes washing apparatus 20 and slicing apparatus 22 that function substantially as previously described. However, in this embodiment the potato slices 24PP have a desired size and shape for preparing dehydrated potato pieces 60. The potato slices 24PP are deposited on the conveyor belt 26 in a monolayer and are rinsed using rinsing nozzles 28 substantially as previously described.

In addition, in this embodiment the potato slices 24PP can be blanched prior to dockering using a blanching apparatus 64. The blanching apparatus 64 produces hot water and the potato slices 24PP can be held in the water for a time period sufficient to heat the potato slices 24PP to a temperature of about 165° F. (73° C.).

Following blanching, the potato slices 24PP can be dockered using a dockering brush 32 having flexible bristles 34 to form dockered potato slices 24PPD, substantially as previously described.

Next, the dockered potato slices 24PPD can be dehydrated using a dehydrating apparatus 66. The dehydrating apparatus 66 can be configured to heat the dockered potato slices 24PPD with hot air to temperatures in the range of about 150° F. (66° C.) to 200° F. (93° C.) for a time period of from 30 minutes to 4 hours. A representative moisture content of the dehydrated potato pieces 60 can be from about 5% to 10%. Dehydration can also be performed as described in U.S. Pat. No. 5,071,661, which is incorporated herein by reference.

Following dehydration (or alternately prior to dehydration) the dehydrated potato pieces 60 can be seasoned. The dehydrated potato pieces 60 are then deposited on the packaging apparatus 52 and packaged as required. Prior to consumption by an end user, the dehydrated potato pieces 60 can be rehydrated to a desired moisture content using a rehydration apparatus 62. Alternately, rehydration can occur during a cooking process using the potato pieces 60 such as by incorporation in a liquid containing food product (e.g., soup).

Figure 7A:
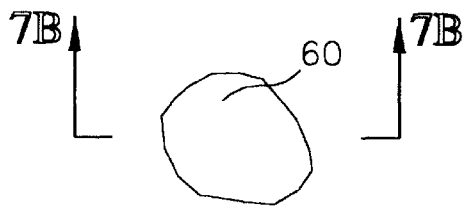
FIG. 7A is a plan view taken along line 7A—7A of FIG. 2C illustrating a dehydrated potato piece prepared in accordance with the invention.
Figure 7B:
FIG. 7B is a cross sectional view taken along section line 7B—7B of FIG. 7A.

As shown in FIGS. 7A and 7B, the dehydrated potato pieces 60 are substantially free of pillows and blisters, and remain substantially free of pillows and blisters during rehydration. Also, during dehydration of the dockered potato slices 24PPD, the rate of dehydration is increased due to the dockering process providing an increased surface area for drying. Still further, the dehydrated potato pieces 60 absorb water more rapidly during rehydration, reducing the rehydration time and increasing the amount of water absorbed.

EXAMPLES

The following examples were conducted by varying different parameters of the previously outlined processes. One variable parameter is the configuration of the rotating dockering brush 32 used to perforate the raw potato slices 24. Three different dockering brushes 32 were used. The dockering brushes are designated as #2, #3, and #4 with bristle thickness ranging from 0.02 inches (0.05 cm) to 0.036 inches (0.091 cm). Additionally, a manually held stainless steel dockering tool (not shown) having pins with a diameter of about 0.033 inches (0.084 cm) was used for comparison with the dockering brushes 32. The pins of the dockering tool are not flexible as are the bristles 34 of the dockering brushes 32. The significant parameters of each of the brushes 32 and of the dockering tool are listed in Table 1.

TABLE 1

|  | Brush No. | | | Dockering |
|---|---|---|---|---|
|  | 2 | 3 | 4 | Tool |
| Bristle free length | | | | |
| inches | 1.44 | 1.88 | 1.75 | 0.094 |
| (cm) | (3.66) | (4.78) | (4.44) | (0.24) |
| Bristle thickness | | | | |
| inches | 0.020 | 0.032 | 0.036 | 0.033 |
| (cm) | (0.05) | (0.08) | (0.09) | (0.08) |
| Bristle count | | | | |
| per in$^2$ | 100–160 | 140–160 | 80–100 | 33 |
| (cm$^2$) | (16–25) | (22–25) | (12–16) | (5.1) |

Example 1

Russet Burbank potatoes 18 were sorted to remove misshapen or defective tubers. The selected potatoes 18 were then washed and scrubbed with a washing apparatus 20 in the form of a Hobart scrubber. Twenty pounds of the washed and scrubbed potatoes 18 were then sliced to produce raw potato slices 24 having a thickness of about 0.090 inches (0.23 cm). The potato slices 24 were then rinsed with tap water to remove surface starch.

Next, the potato slices 24 were placed on a conveyor belt 26 in a single layer. Portions of the potato slices 24 were dockered using each of the various dockering brushes 32 and the dockering pin as set out in Table 1. The potato slices 24 were then fried in soybean oil at 370° F. (188° C.) for about 4 minutes 50 seconds to produce potato chips 38 having a moisture content of between 2.0 and 7.0 percent.

Following frying, the potato chips 38 were held overnight and then evaluated. The experimental design, process measurements, and evaluations are listed in Table 2.

In Table 2, the Bubble Evaluation data is an indication of the size of the bubble(s) as described below. For purposes of evaluation, blisters and pillows are referred to as bubbles. No distinction is made between the two.

Category No. 1—Category No. 1 chips 38 have no bubbles greater than about 6 mm. The chips 38 typically have a number of small bubbles and significant areas of the chip surface are unbubbled.

Category No. 2—Category No. 2 chips 38 are lightly bubbled, either one large (<2.5 cm) bubble or a few small bubbles, covering less than one-half of the chip surface are category No. 2 chip. At least half of the chip surface is not bubbled.

Category No. 3—Category No. 3 chips 38 have more than one-half of their surface covered with bubbles, with a maximum bubble size of 2.5 cm. Less than one-half of the chip surface is not bubbled.

Category No. 4—Category No. 4 chips 38 have one or more bubbles larger than 2.5 cm in diameters, many of which may be broken.

Category No. 5—Category No. 5 chips 38 have large bubbles which are usually broken after normal handling. Such bubbles typically consume major portions of the chips 38.

Bubbles in categories 1, 2, and 3 are not found to be objectionable. The bubble size is small enough to not detract from the appearance nor break easily during handling and packaging. Emphasis is placed on the No. 4 and No. 5 bubbles due to the large size of the bubbles. No. 4 and 5 bubbles are obvious and break easily during handling and packaging.

TABLE 2

|  | Samples | | | | |
|---|---|---|---|---|---|
| Parameter | A | B1 | B2 | B3 | C |
| DOCKER BRUSH | NA | flexible bristle | flexible bristle | flexible bristle | fixed pin |
| DOCKER BRUSH | | | | | |
| thickness, in | NA | 0.020 | 0.032 | 0.036 | 0.033 |
| thickness, cm | NA | .05 | .08 | .09 | .084 |
| PARFRY TEMPERATURES | | | | | |
| start temp, degree F. | 370 | 370 | 370 | 370 | 370 |
| start temp, degree C. | 188 | 188 | 188 | 188 | 188 |
| RESULTS/EVALUATION | | | | | |
| parfry moisture (24 hr) % | 6.6 | 5.7 | 4.5 | 3.1 | 2.9 |
| BUBBLE EVALUATION | | | | | |
| % No. 1 bubble | 13 | 26 | 15 | 27 | 55 |
| % No. 2 bubble | 39 | 45 | 55 | 61 | 39 |
| % No. 3 bubble | 33 | 26 | 28 | 12 | 6 |
| % No. 4 bubble | 11 | 2 | 2 | 0 | 0 |
| % No. 5 bubble | 4 | 1 | 0 | 0 | 0 |
| % Total Nos. 4 & 5 | 15 | 3 | 2 | 0 | 0 |

Example 1 compared five variables including an undockered control, three samples treated with a dockering brush 32 having flexible bristles 34 and one sample treated with a fixed dockering pin.

Sample A was the control and was not dockered.

Samples B1, B2 and B3 were dockered with a dockering brush 32 having flexible bristles 34. Sample C was dockered with a stainless steel dockering pin.

Results show:

1. The total number of No. 4 and No. 5 bubbles decreased from 15% for A to 3%, 2%, 0% and 0% for B1, B2, B3 and C respectively.

2. The dockering brush 32 used for samples B1, B2 and B3 released the slices from the flexible bristles. The fixed stainless steel dockering pin, C, was very effective in reducing blistering and pillowing but the slices would not release from the pins. Manual removal of the slices from the pins was required.

3. Dockered slices 24D fried to about 1% to 3½% lower moisture under the same conditions. This has economic benefit in that the fry time can be reduced as the target moisture is still obtained.

Example 2

A second example was performed using Russet Norkotah potatoes to verify the results of Example 1. Table 3 shows the test variables, parameters and results. The dockering brushes used for each sample were the same as Example 1. The fry temperature was 370° F. and a fry time of 4 minutes 50 seconds was used for all samples.

Results show:

1. The flexible bristles 34 with a thickness of 0.032 inches or greater reduced the percentage of No. 4 and No. 5 bubbles from 25% for the undockered sample (A) to 2%, 2% and 0% for the dockered samples, B1, B2 and B3.

2. Use of the stainless steel dockering pin reduced the No. 4 and No. 5 bubbles to 0% with the slices 24 having to be manually removed from the pins whereas the slices released automatically from the flexible bristles 34.

3. Slices 24 that were dockered, fried to about 1% to 3.5% lower moisture under the same conditions as the undockered sample. The reduced moisture content was economically beneficial in reducing fry time while obtaining a target moisture.

TABLE 3

| Parameter | Samples | | | | |
|---|---|---|---|---|---|
| | A | B1 | B2 | B3 | C |
| DOCKER BRUSH | NA | flexible bristle | flexible bristle | flexible bristle | fixed pin |
| DOCKER BRUSH | | | | | |
| thickness, in | NA | 0.020 | 0.032 | 0.036 | 0.033 |
| thickness, cm | NA | 0.050 | 0.080 | 0.090 | 0.084 |
| PARFRY TEMPERATURES | | | | | |
| start temp, degree F. | 370 | 370 | 370 | 370 | 370 |
| start temp, degree C. | 188 | 188 | 188 | 188 | 188 |
| RESULTS/EVALUATION | | | | | |
| parfry moisture (24 hr) % | 5.8 | 5.1 | 4.1 | 3.9 | 2.2 |
| BUBBLE EVALUATION | | | | | |
| % No. 1 bubble | 11 | 29 | 12 | 25 | 84 |
| % No. 2 bubble | 23 | 40 | 60 | 59 | 15 |
| % No. 3 bubble | 41 | 29 | 26 | 16 | 1 |
| % No. 4 bubble | 19 | 2 | 2 | 0 | 0 |
| % No. 5 bubble | 6 | 0 | 0 | 0 | 0 |
| % Total Nos. 4 & 5 | 25 | 2 | 2 | 0 | 0 |

Example 3

A third example was conducted to determine the effects of dockering on rehydration of dried potatoes.

The process consisted of:

(1) slicing the potatoes to about 0.125" thickness;

(2) dipping in a 220 ppm sulfite solution;

(3) blanching in 180° F. water for 2 minutes 45 seconds;

(4) cooling slices to ambient temperature in water;

(5) draining excess water;

(6) dockering by various means as in Example 1 as follows:
   A—not dockered
   B1—0.020 inch flexible bristle
   B2—0.032 inch flexible bristle
   B3—0.036 inch flexible brush
   C—0.033 inch fixed stainless steel dockering pin;

(7) hot air drying to dehydrate to 5% moisture with 6 minutes at 200° F. (93° C.) and 155 minutes at 150° F. (66° C.).

(8) rehydrating while determining the rehydration ratio at constant intervals of time.

Figure 8:
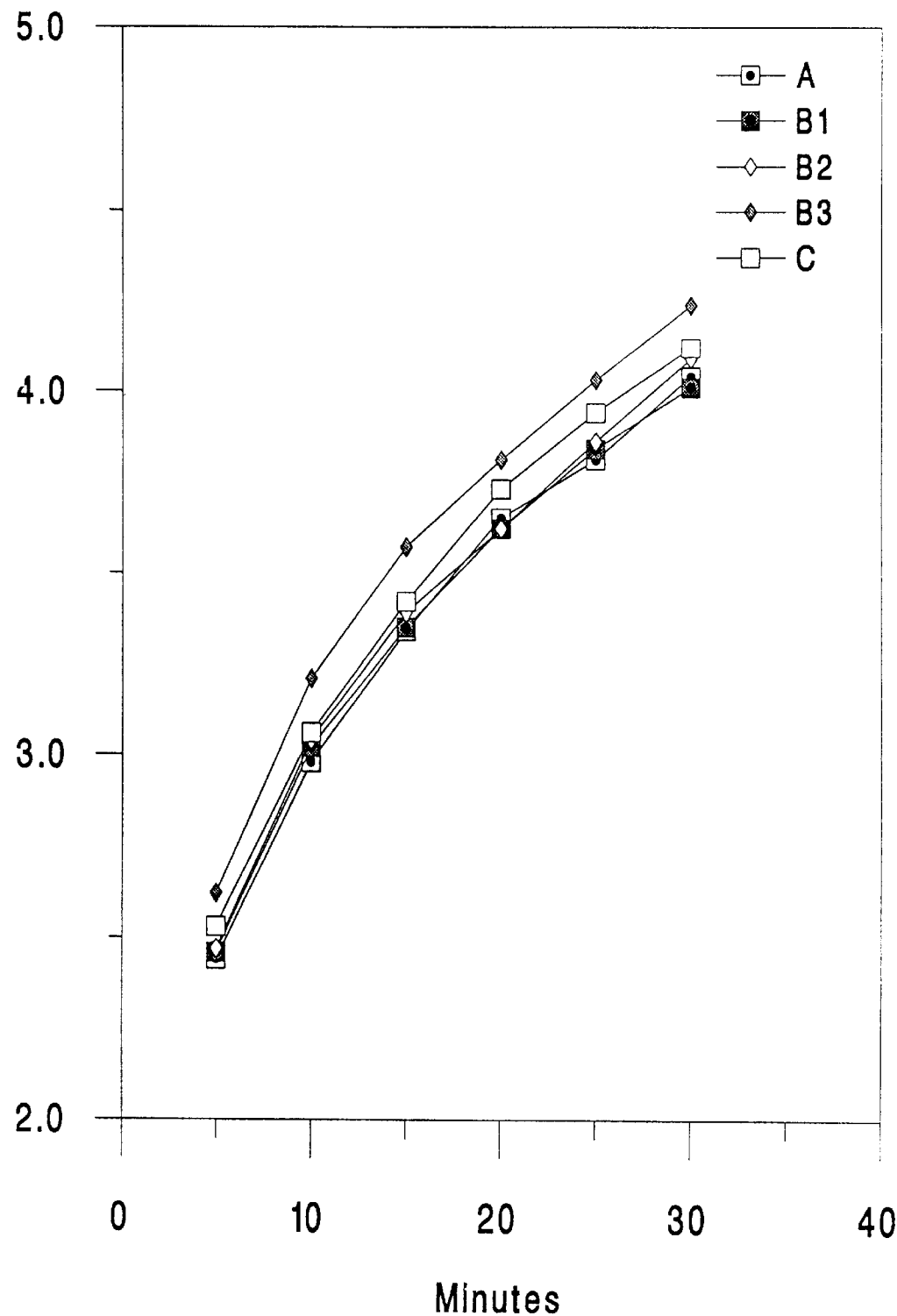
FIG. 8 is a graph illustrating the rehydration ratio for a dehydrated potato piece prepared in accordance with the process of the invention.

Rehydration ratios were obtained by placing 100 gm of dehydrated slices in a perforated basket. The basket with slices was placed in boiling water and allowed to remain for 5 minutes. The basket was removed from the water, placed on an absorbent towel, tapped gently to remove excess water and weighed. The basket was placed back in the boiling water for 5 more minutes and re-weighed as before. This procedure was repeated at five minute intervals for a total of 30 minutes. The rehydration ratio was calculated as follows:

Rehydration Ratio=weight rehydrated slices−weight of basket/ weight dehydrated (dry slices)−weight of basket Example 3 showed the following results which are summarized in Table 4:

1. A desired rehydration ratio of 4:1 was achieved 5 minutes sooner when dockering slices with large diameter bristles as in sample B3. This consistent improvement of rehydration time is clearly shown in FIG. 8. In FIG. 8 sample A is represented by a square with a black dot. Sample B1 is the shaded square with a black dot. Sample B2 is the diamond. Sample B3 is the shaded diamond. Sample C is the clear square.

2. The final rehydration ratio of sample B3 was 5% higher than that of the undockered sample. All dockered samples showed a slight increase in the rehydration ratio. The increase in rehydration ratio becomes more significant as the size of the bristles increases.

3. Sample C dockered with a stainless steel fixed pin dockering roller had rehydration ratios 2.0 to 3.7% higher than the undockered sample (A1). Once again, the fixed pin dockering system would not release the potato slices from the pins. The slices had to be manually removed whereas the flexible bristles of the dockering brush released the slices automatically.

TABLE 4

| PARAMETER | Samples | | | | |
|---|---|---|---|---|---|
| | A | B1 | B2 | B3 | C |
| Docker brush | NA | flexible bristle | flexible bristle | flexible bristle | fixed pin |
| Dockering brush | | | | | |
| thickness (inches) | NA | 0.020 | 0.032 | 0.036 | 0.033 |
| thickness, cm | | 0.050 | 0.080 | 0.090 | 0.084 |
| Slice thickness | | | | | |
| (inches) | 0.095 | 0.095 | 0.095 | 0.095 | 0.095 |
| (cm) | 0.241 | 0.241 | 0.241 | 0.241 | 0.241 |
| Drying time (min) @ 200 deg F. (93.3 deg C.) | 6 | 6 | 6 | 6 | 6 |
| Drying time (min) @ 150 deg F. (65.6 deg C.) | 155 | 155 | 155 | 155 | 145 |
| Rehydration ratio | | | | | |
| at 5 min | 2.44 | 2.46 | 2.47 | 2.62 | 2.53 |
| at 10 min | 2.98 | 3.02 | 3.04 | 3.21 | 3.06 |
| at 15 min | 3.34 | 3.35 | 3.39 | 3.57 | 3.42 |
| at 20 min | 3.65 | 3.62 | 3.62 | 3.81 | 3.73 |
| at 25 min | 3.81 | 3.84 | 3.86 | 4.03 | 3.94 |
| at 30 min | 4.04 | 4.01 | 4.09 | 4.24 | 4.12 |
| Rehydration ratio variance from control | | | | | |
| % difference from A @ 5 min | NA | 0.8 | 1.2 | 7.4 | 3.7 |
| % difference from A @ 10 min | NA | 1.3 | 2.0 | 7.7 | 2.7 |
| % difference from A @ 15 min | NA | 0.3 | 1.5 | 6.9 | 2.4 |

TABLE 4-continued

| PARAMETER | Samples | | | | |
| --- | --- | --- | --- | --- | --- |
| | A | B1 | B2 | B3 | C |
| % difference from A @ 20 min | NA | −0.8 | −0.8 | 4.4 | 2.2 |
| % difference from A @ 25 min | NA | 0.8 | 1.3 | 5.8 | 3.4 |
| % difference from A @ 30 min | NA | 0.7 | 1.2 | 5.0 | 2.0 |

Thus the invention provides an improved process for preparing potato products including potato chips, cottage fries, French fries, and dehydrated potato pieces, by modifying raw potato pieces using a dockering process. In all cases the finished products are characterized by fewer pillows and blisters, and a reduced moisture content. For fried products, frying time is reduced. For dehydrated products, dehydration and rehydration times are reduced while rehydration yields are increased.

While the invention has been described by reference to specific embodiments, it will be apparent that other alternative embodiments and methods of implementation or modification may be employed without departing from the true spirit and scope of the invention.

We claim:

1. A process for preparing a potato product comprising:
providing a plurality of raw potato slices;
placing the slices in a monolayer on a moving conveyor belt;
providing a rotating dockering brush mounted proximate to the belt, the brush comprising a plurality of flexible bristles;
dockering the slices by moving the slices under the rotating brush with the bristles penetrating the slices to form a plurality of openings, then bending to enlarge the openings, and then straightening to release dockered slices;
cooking the dockered slices; and
venting moisture through the openings during the cooking step to reduce pillowing and blistering of the dockered slices.

2. The process of claim 1 further comprising controlling the dockering step to form each opening with a substantially conical shape.

3. The process of claim 1 wherein the rotational velocity of the bristles is less than the linear velocity of the conveyor belt.

4. The process of claim 1 wherein the cooking step comprises a method selected from the group consisting of frying, baking and parfrying.

5. The process of claim 1 wherein the cooking step comprises dehydrating the potato slices.

6. A process for preparing a potato product comprising:
providing a plurality of raw potato slices;
providing a rotating dockering brush comprising a plurality of flexible bristles;
moving the potato slices across the dockering brush such that the bristles initially contact the potato slices, bend to penetrate the potato slices with a random pattern of openings, reverse bend to enlarge the openings in a substantially conical shape, then straighten to release dockered potato slices;
cooking the dockered slices; and
venting moisture during the cooking step through the openings to reduce pillowing and blistering of the dockered slices.

7. The process of claim 6 wherein the cooking step comprises frying the dockered slices in hot oil.

8. The process of claim 6 further comprising controlling the linear velocity of the potato slices and the rotational velocity of the dockering brush such that the bristles bend away from the direction of movement of the potato slices during penetration, bend towards the direction of movement to enlarge the openings, then straighten to release the dockered potato slices.

9. A process for preparing a potato product comprising:
providing a plurality of raw potato slices;
providing a conveyor belt moving with a predetermined linear velocity;
providing a rotating dockering brush comprising a plurality of flexible bristles, the brush rotatably mounted with respect to the belt such that the bristles rotate with a predetermined rotational velocity, and flex upon contact with the belt;
moving the slices under the bristles with the bristles initially contacting the slices, then bending to penetrate the slices and form a plurality of generally conically shaped openings, and then straightening to release dockered slices; and
frying the dockered slices with the openings venting moisture to reduce pillowing and blistering of the dockered slices.

10. The process of claim 9 further comprising selecting a size and number of the openings to provide the potato product with a moisture content that is about 1% to 3.5% less than a second potato product having undockered potato slices.

11. The process of claim 9 wherein during the moving step the bristles continue bending upon contact with the belt initially away from the rotational direction of the bristles and then towards the rotational direction to enlarge the openings.

12. The process of claim 9 wherein each bristle has a diameter of from 0.02 to 0.06 inches, a length of from 1.25 to 2.0 inches, and a bristle count of from 80–160 per $in^2$.

13. The process of claim 9 wherein the potato product comprises a product selected from the group consisting of potato chips, cottage fries, and French fries.

14. A process for preparing a potato product comprising:
providing a conveyor belt moving at a predetermined linear velocity;
mounting a rotatable dockering brush comprising a plurality of flexible bristles proximate to the conveyor belt with the bristles configured to flex upon contact with the belt;
rotating the dockering brush such that the bristles have a predetermined rotational velocity relative to the linear velocity of the belt;
placing a plurality of raw potato slices in a monolayer on the conveyor belt;
moving the slices across the brush with the bristles bending and penetrating into the slices to form a random pattern of generally conically shaped openings as the slices are supported by the belt, and with the bristles then straightening to release dockered slices; and
cooking the dockered slices with the generally conically shaped openings venting moisture to reduce pillowing and blistering of the dockered slices.

15. The process of claim 14 wherein the rotational velocity is from about 40% to 100% of the linear velocity.

16. The process of claim 14 wherein the belt comprises linked chains with a resilient surface.

17. The process of claim 14 further comprising blanching the raw potatoes prior to the moving step, and wherein the cooking step comprises dehydrating the dockered slices.

18. A process for preparing potato chips comprising:

providing a plurality of raw potato slices;

providing a conveyor belt moving with a linear velocity;

placing the slices in a monolayer on the conveyor belt;

providing a rotating dockering brush mounted proximate to the belt, the brush comprising a plurality of flexible bristles rotating in a rotational direction and with a rotational velocity that is less than the linear velocity of the conveyor belt;

dockering the slices by moving the slices under the rotating brush with the bristles initially contacting the slices, bending away from the rotational direction to penetrate the slices with a random pattern of openings, then bending towards the rotational direction to form the openings in a conical shape, then straightening to release dockered slices as the conveyor belt pulls the slices from the bristles;

frying the dockered slices; and venting moisture from the dockered slices through the openings during the frying step to reduce pillowing, blistering, and the moisture content of the dockered slices.

19. The process of claim 18 wherein the frying step is performed for a time period sufficient to achieve a moisture content of from about 1–12%.

20. A process for preparing French fries comprising:

providing a plurality of raw, French fry potato pieces;

providing a moving conveyor belt;

placing the pieces in a monolayer on the moving conveyor belt;

rinsing the pieces;

providing a rotating dockering brush mounted proximate to the belt, the brush comprising a plurality of flexible bristles;

dockering the pieces by moving the pieces across the rotating brush with the bristles contacting the pieces, then bending upon contact with the pieces, then continuing bending upon contact with the belt to form generally conically shaped openings in the pieces, then straightening to release dockered pieces;

parfrying the dockered pieces to a moisture content of from about 1% to 70% with the openings venting moisture to reduce pillowing and blistering of the dockered pieces; and following parfrying, cooling the dockered pieces.

21. The process of claim 20 wherein the cooling step comprises freezing the dockered pieces.

22. The process of claim 20 further comprising following the cooling step, reheating the dockered pieces.

23. The process of claim 20 wherein the moisture content is about 1% to 12%.

24. The process of claim 20 wherein the conveyor belt comprises linked chains with a resilient surface.

25. A process for preparing dehydrated potato pieces comprising:

providing raw potato slices;

blanching the raw potato slices to form blanched slices;

providing a moving conveyor belt;

placing the blanched slices in a monolayer on the moving conveyor belt;

providing a rotating dockering brush mounted proximate to the belt, the brush comprising a plurality of flexible bristles;

dockering the blanched slices by moving the blanched slices under the rotating brush with the bristles initially bending upon contact with the blanched slices to form openings, then continuing bending upon contact with the belt to enlarge the openings, then straightening to release blanched slices;

following the dockering step, dehydrating the blanched slices to a moisture content of from about 5% to 10% with the openings providing an increased surface area for venting moisture to reduce pillowing and blistering of the dockered slices and to form dehydrated slices; and rehydrating the dehydrated slices with the increased surface area of the openings absorbing moisture.

26. The process of claim 25 further comprising controlling the dockering step to form each opening with a generally conical shape.

* * * * *